United States Patent [19]

Brockmeyer

[11] 4,364,101

[45] Dec. 14, 1982

[54] VEHICLE LAMP WITH A LAMP CARRIER MADE FROM A SHEET METAL BLANK

[75] Inventor: Hans P. Brockmeyer, Lippstadt, Fed. Rep. of Germany

[73] Assignee: Westfälische Metall Industrie KG Hueck & Co., Lippstadt, Fed. Rep. of Germany

[21] Appl. No.: 175,770

[22] Filed: Aug. 6, 1980

[30] Foreign Application Priority Data

Sep. 4, 1979 [DE] Fed. Rep. of Germany ....... 2935650

[51] Int. Cl.[3] ........................ B60Q 1/26; F21M 11/00

[52] U.S. Cl. ........................................ 362/80; 362/83; 362/249; 362/368

[58] Field of Search .................... 362/80, 249, 368, 83

[56] References Cited

U.S. PATENT DOCUMENTS 3,754,131 8/1973 DiSalvo et al. .................... 362/249

*Primary Examiner*—Irwin Gluck

*Attorney, Agent, or Firm*—Max Fogiel

[57] ABSTRACT

Light bulbs of a multi chamber vehicle lamp are inserted into a lamp carrier made of sheet metal. Conductor strips are stamped out of the sheet metal for current conduction. The lamp carrier forms a common mass connection for all light bulbs. The contacting to the respective center pole of the light bulbs is effected directly by the free end portion of the conductor strip which is stamped out from a region of the lamp carrier remote from the light bulb socket. By a deformation of the conductor strip, the end portion is placed on the center axis of the opening accommodating the light bulb, and engages the center pole of the light bulb under pretension.

11 Claims, 9 Drawing Figures

VEHICLE LAMP WITH A LAMP CARRIER MADE FROM A SHEET METAL BLANK

BACKGROUND OF THE INVENTION

The invention relates to a vehicle lamp with a lamp carrier made from a sheet metal blank in which several openings are provided accommodating the bulbs into which the bulbs are electrically conductively inserted with their sleeve-like socket contact and from which conductor strips are stamped which serve as the electrical conductors for the individual bulbs.

In the known vehicle lamps of this type (DE-AS No. 2,441,330) the conductor strips stamped from the lamp carrier extend with their one end close to the openings formed in the lamp carrier and accommodating the bulbs. For the electrical connection of these conductor strips with the center pole of the bulbs contact springs are clampingly pushed onto the conductor strips, such contact springs being bifurcatingly slotted and engaging with their free end under pretension the center pole of the light bulb.

SUMMARY OF THE INVENTION

It is the purpose of the invention to simplify the electrical connection of the conductor strip to the center pole of the bulb and to make it less expensive, namely by omitting the additional contact spring. This task is solved according to the invention in that the free ends of the stamped-out conductor strips springly engage the center pole of the respective bulb and that the respective end portion of the stamped-out conductor strip engaging the center pole of the bulb is stamped from a portion of the lamp carrier remote from the opening accommodating the light bulb socket and is brought into its center position underneath the opening accommodating the light bulb by a deformation of the conductor strip.

In an advantageous embodiment of the inventive concept the individual conductor strips are stamped out in Z-shape in the region of the opening for accommodating the light bulb, with the terminal section extending past the opening for accommodating the light bulb and the center section of the Z-shape being so deformed that the free end portion of the Z-shape becomes positioned centrally below the opening for accommodating the light bulb. This embodiment is particularly space saving. In an embodiment according to a further concept of the invention the free end portion is folded out of the lamp carrier by bending the center section of the Z-shape through 180°. This embodiment has the additional advantage that in addition to the straight-line end portion the thereto adjacent center portion and folded out of the lamp carrier by 180° is also subject to bending stress and the latter also to torsion. A spring so constructed produces a very advantageous spring characteristic.

According to a further possibility of another embodiment of the invention the end portion is positioned on the center axis of the opening for accommodating the light bulb by forming a hairpin fold in the center section of the Z-shape. Additionally, the free end portion of the Z-shape is bent off. This embodiment can be economically produced with simple tools.

According to a further advantageous embodiment of the invention the end portion of the conductor strip is stamped out so as to extend away from the light bulb opening and is bent through 180°, such that the free end of the end portion engages the center pole of the light bulb under prestress. With this and the embodiments described hereinbefore it is possible for the end portion of all conductor strips to be positioned beneath the light bulb opening, to be stamped out of the lamp carrier.

To change the spring characteristic of the springy portion of the stamped-out conductor strip it is advantageous to springly support the end portion of the stamped-out conductor strip between the contact point of the end portion with the center pole of the light bulb and the thereto adjacent deformed portion of the conductor strip. If the lamp carrier and the conductor strips stamped out therefrom are positioned on a plate-shaped housing portion of synthetic plastic, then it is advantageous to support the end portion of the conductor strip by an arm formed on the housing part, preferably of springy characteristics. Such a springy arm increases the spring force due to its own elasticity, and thus increases the force with which the conductor strip ends are pressed against the light bulb pole, and on the other hand it serves as a support so that the deformed part of the conductor strip is subjected more to bending and less to torsion.

In an advantageous embodiment of the invention the spring characteristic of the springy portion of the conductor strip can be improved if the conductor strip is provided ahead of the free springy end portion and the deformed portion with a material constriction which is not in contact with the plate shaped housing part. In order to make the springy end portion of the conductor strip more bending resistant and thus to make the deformed portion participate more strongly in the spring effect, the end portion is profiled. It is angular or U-shaped in cross section.

BRIEF DESCRIPTION OF THE DRAWINGS

The drawing illustrates several advantageous embodiments of the invention. It shows in FIG. 1 a center longitudinal section through a part of the light, FIG. 2 a view from the direction X of the lamp carrier and of the plate shaped housing part supporting it, FIG. 3 a section on line A—A and FIG. 4 a section on line B—B, whereas

DESCRIPTION OF THE PREFERRED EMBODIMENTS

Figure 1:
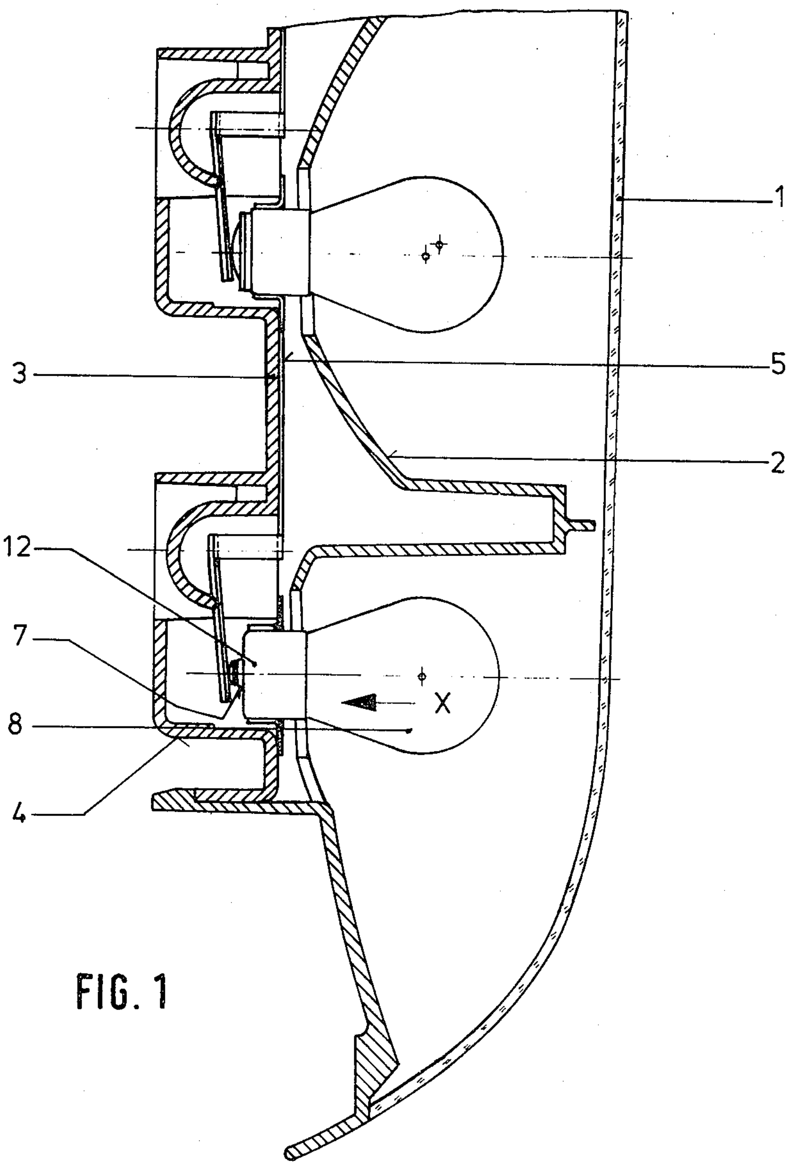

The light illustrated in FIG. 1 consists essentially of a multi-part lens 1, the reflector which subdivides the light into several chambers, the plate shaped housing part 3 and the lamp carrier 5. Cup-shaped depressions 4 are formed in the plate-shaped housing part 3 which accommodate the electrical contact devices for the respective light bulbs, which are shown in FIGS. 2–9.

Conductor strips 6 are stamped from the lamp carrier 3 which constitute the electrical connections for the center pole 7 of the light bulbs 8. The conductor strips 9 form the connection between the individual sections 10 of the lamp carrier 5. Openings 11 are stamped in the sections 10 of the lamp carrier 5, into which the light bulbs 8 are set with their sockets 12. When stamping the light bulb openings 11 two opposite lugs 13 remain which are angled off through 90° and constitute the mass contact for the light bulb socket 12.

Figure 2:
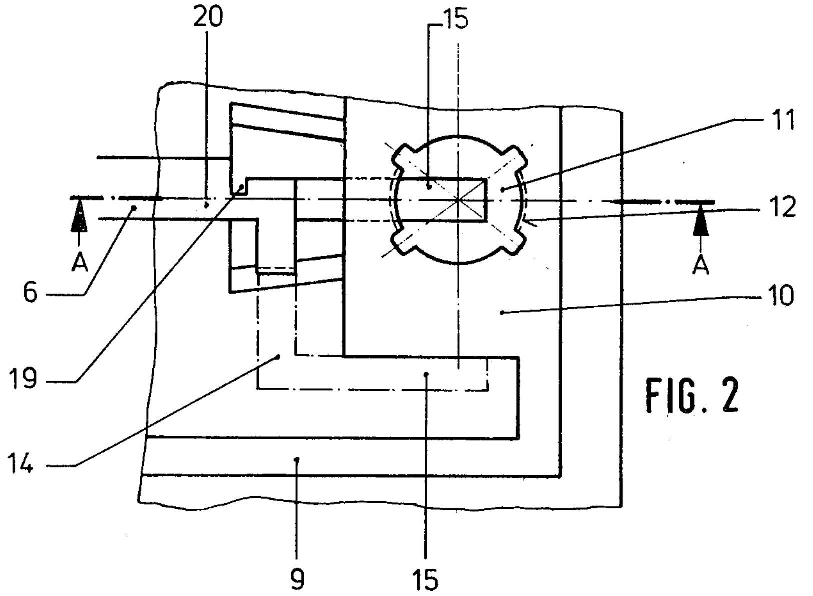
Figure 3:
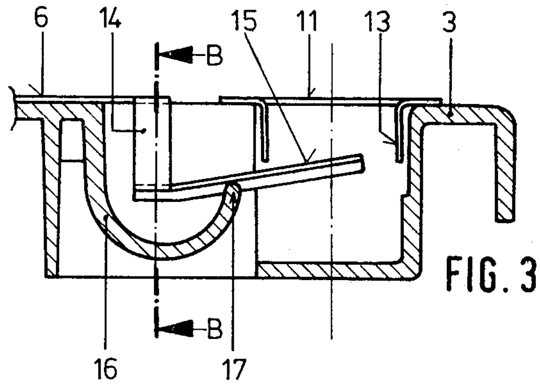
Figure 4:
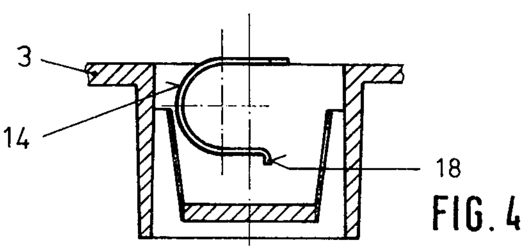

The electrical connection illustrated in FIGS. 2, 3 and 4 for the center pole 7 of the light bulb is formed by the conductor strip 7 which is of Z-shaped configuration where it is stamped in the region of the opening 11 for accommodating the light bulb, and which is from the lamp carrier 5 with its free end portion 15 by bending the center portion 14 of the Z-shape through 180°. The shape of the conductor strip 6 prior to bending is shown in FIG. 2 by the dot-line. The center portion 14 of the Z-shape is bent in U-shaped configuration so that the end portion 15 of the conductor strip 6 extends out of the plane of the lamp carrier 5. This end portion 15 of the conductor strip 6 engages the center pole 7 of the light bulb under pretension. The end portion 15 is supported by a springy arm 16 which is formed on the plate-shaped housing part 3. The supporting point 17 is arranged between the contact point of the end portion 15 with the center pole 7 of the light bulb and the U-shaped bent center portion 14 of the Z-shape of the conductor strip 6. In this manner the end portion 15 has the effect of a double-armed lever. So that the effect of the double-armed lever is not reduced by inherent springiness of the end portion 15, the latter is made more bending resistant by angling-off. The main stress is thus present in the springy and hook-shaped arm 16 and in the U-shaped bent center portion 14 of the Z-shape of the conductor strip 6. To tune the spring characteristic it may be advantageous to provide the part of the conductor strip 6 which is supported on the plate-shaped housing part 3 with a material constriction 19. With this material weaker part the conductor strip 6 no longer rests on the plate-shaped housing part 3.

Figure 5:
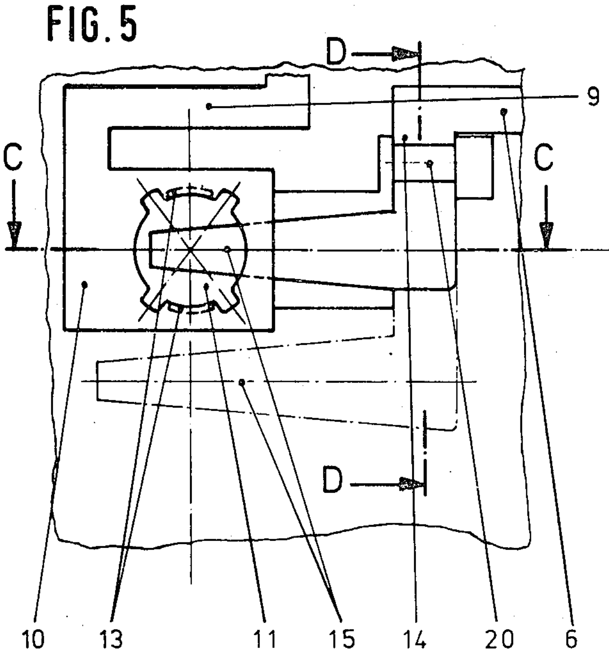
FIG. 5 is a view from the direction X onto another embodiment of the lamp carrier and the plate shaped housing part supporting it.
Figure 7:
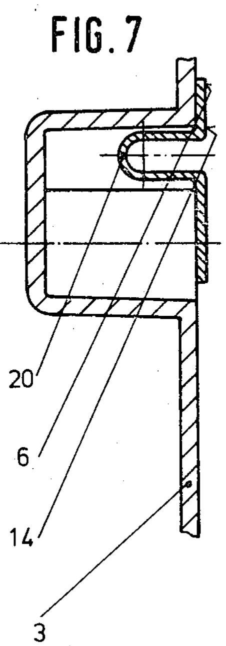
FIG. 7 is a section on line D—D.
Figure 6:
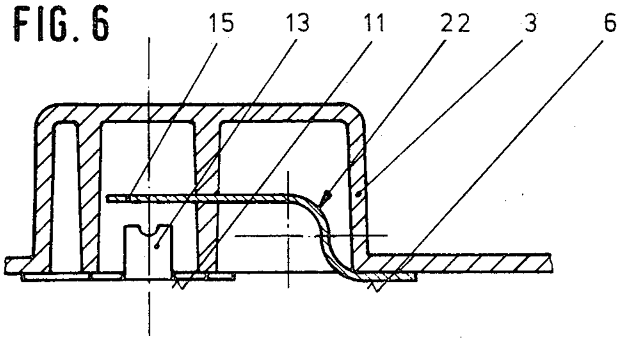
FIG. 6 is a section on line C—C.

FIGS. 5, 6 and 7 show a different embodiment of the invention which differs from the preceding embodiment essentially in that by forming of a hairpin fold 20 in the center portion 14 the free end portion of the Z-shape is placed into the center plane of the opening 11 for accommodating the light bulb and the free end portion 15 of the Z-shape form is angled off. The center portion 14 of the Z-shape rests with its two end parts on the plate-shaped housing part 3. The free end portion 15 converges to its free end which engages the center pole 7 of the light bulb under pretension. The convergence of the end portion 15 also contributes to an advantageous spring characteristic.

Figure 8:
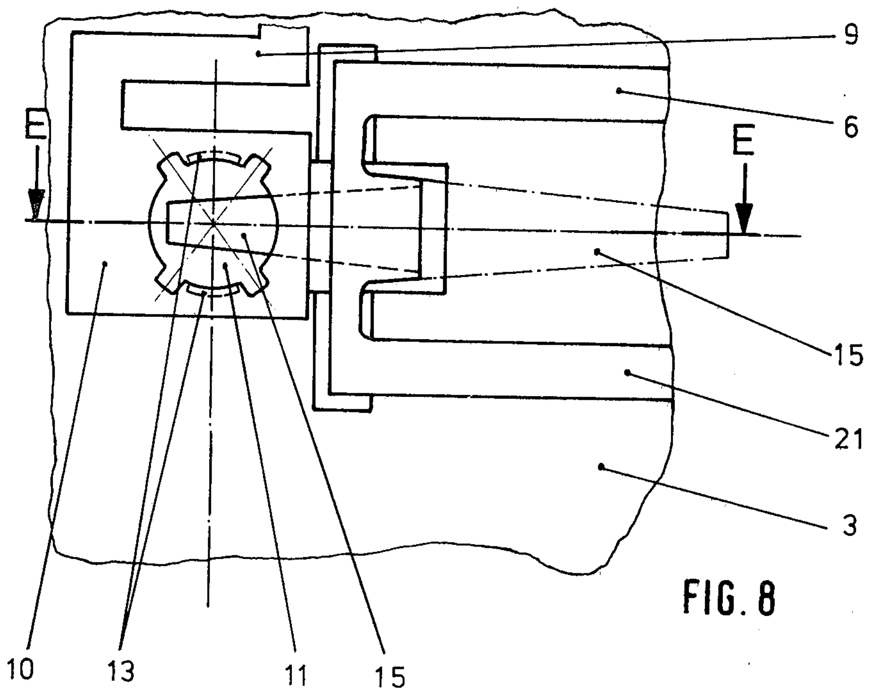
FIG. 8 is a view from the direction X onto a further embodiment of the lamp carrier and the plate shaped housing part supporting it and FIG. 9 is a section on line E—E.
Figure 9:
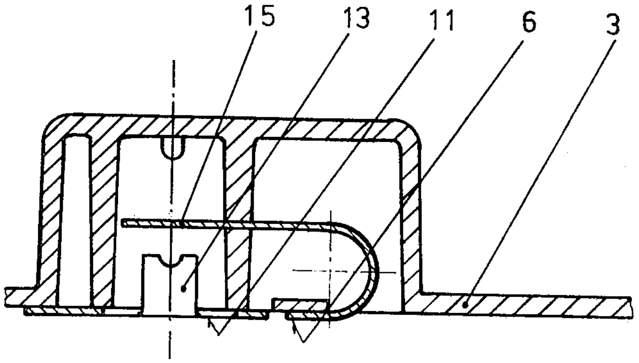

A further embodiment of the invention is shown in FIGS. 8 and 9 which differ from the preceding embodiment in that the end portion 15 of the conductor strip 6 is stamped out so as to face away from the opening 11 for the light bulbs and is bent off through 180° in the region. To be able to support the conductor strip 6 particularly with reference to torsional loading on the plate-shaped housing part 3, the end portion of the conductor strip resting on the housing part 3 is shaped to have a large surface. For this reason the conductor strip has a special arm 21 which does not serve for conducting current and serves only for connection purposes.

I claim:

1. Vehicle lamp with a lamp carrier, comprising: a sheet metal blank having a plurality of openings; light bulbs accommodated in said openings and electrically conductively seated with sleeve-shaped socket contacts; electrical conductor strips stamped from said lamp carrier sheet metal blank and serving as electrical conductors for the individual light bulbs, said electrical conductor strips stamped from said lamp carrier remaining at their original position within said lamp carrier after having been stamped out from said lamp carrier, said light bulbs having center poles, said stamped-out conductor strips having free ends engaging springly the center pole of a respective light bulb, said conductor strip having a respective end portion contacting the center pole of the light bulb, said end portion being stamped out from a region of the lamp carrier substantially remote from an opening accommodating a light bulb socket, said end portion being brought by a deformation of the conductor strip from its original position into a central position underneath a central axis of said opening accommodating said light bulb, said electrical conductor strips being integral and one piece with said lamp carrier before being stamped out from said lamp carrier, said conductor strips after being stamped out having when operative an electrical polarity which is opposite to the electrical polarity of the lamp carrier.

2. Vehicle light according to claim 1, wherein the individual conductor strips are stamped out with a Z-shaped configuration in the region of said opening for accommodating said light bulb with said end portion extending past said opening for accommodating said light bulb, the center portion of the Z-shape being deformed so that the free end portion of the Z-shape is located centrally below said opening for accommodating said light bulb.

3. Vehicle lamp according to claim 2, wherein the free end portion is folded out of the lamp carrier by bending of said center portion of the Z-shape through 180°.

4. Vehicle lamp according to claim 2, wherein the free end portion of the Z-shape is placed on the center axis of said opening for accommodating said light bulb by a hairpin fold in said center portion.

5. Vehicle light according to claim 4, wherein the free end portion of the Z-shape is angled off.

6. Vehicle lamp according to claim 4, wherein said hairpin fold has an arm adjacent the free end portion and being shorter than another arm thereof.

7. Vehicle lamp according to claim 1, wherein the end portion of the conductor strip is stamped out so as to extend away from said light bulb opening and is bent off through 180°, such that the free end of said end portion engages the center pole of said light bulb under pretension.

8. Vehicle lamp according to claim 1, including a plate-shaped housing part comprised of synthetic plastic and having an arm formed on said housing part, said lamp carrier and said conductor strips stamped therefrom being placed on said plate-shaped housing part, the end portion of the conductor strip being springly supported by said arm formed on said housing part.

9. Vehicle lamp according to claim 1, wherein the conductor strip is located ahead of the springy free end portion, the deformed portion having a material constriction.

10. Vehicle lamp according to claim 1, wherein the end portion of the conductor strip is profiled so that it has an angled or U-shaped cross section.

11. A vehicle lamp according to claim 1, wherein the individual conductor strips are stamped out with a z-shaped configuration in the region of said opening for accommodating said light bulb with said end portion extending past said opening for accommodating said light bulb, the center portion of the Z-shape being deformed so that the free end portion of the Z-shape is located centrally below said opening for accommodating said light bulb, the free end portion being folded out of the lamp carrier by bending of said center portion of the Z-shape through 180°, the free end portion of the Z-shape being placed on the center axis of said opening for accommodating said light bulb by a hairpin fold in said center portion, the free end portion of the Z-shape being angled off, said hairpin fold having an arm adjacent the free end portion and being shorter than another arm thereof, a plate-shaped housing part comprised of synthetic plastic and having an arm formed on said housing part, said lamp carrier and said conductor strips stamped therefrom being placed on said plate-shaped housing part, the end portion of the conductor strip being springly supported by said arm formed on said housing part, the conductor strip is located ahead of the springy free end portion, the deformed portion having a material constriction.

* * * * *